(12) United States Patent
Saito

(10) Patent No.: US 12,315,673 B2
(45) Date of Patent: May 27, 2025

(54) SOLENOID ACTUATOR AND METHOD FOR MANUFACTURING SOLENOID ACTUATOR

(71) Applicant: MIKUNI CORPORATION, Tokyo (JP)

(72) Inventor: Hirofumi Saito, Takizawa (JP)

(73) Assignee: MIKUNI CORPORATION, Tokyo (JP)

( * ) Notice: Subject to any disclaimer, the term of this patent is extended or adjusted under 35 U.S.C. 154(b) by 161 days.

(21) Appl. No.: 18/187,902

(22) Filed: Mar. 22, 2023

(65) Prior Publication Data

US 2023/0386718 A1 Nov. 30, 2023

(30) Foreign Application Priority Data

May 27, 2022 (JP) .................................. 2022-086514

(51) Int. Cl.
*H01F 7/08* (2006.01)
*H01F 7/16* (2006.01)
*F16K 31/06* (2006.01)

(52) U.S. Cl.
CPC ........... *H01F 7/081* (2013.01); *H01F 7/1607* (2013.01); *F16K 31/0675* (2013.01)

(58) Field of Classification Search
CPC .. H01F 7/081; H01F 7/1607; H01F 2007/163; H01F 7/127; H01F 2007/085; F16K 31/0675; H02K 33/00; H02K 1/17; H02K 1/18; H02K 15/00
USPC ........................................................ 335/225
See application file for complete search history.

(56) References Cited

U.S. PATENT DOCUMENTS

| 2004/0021390 | A1* | 2/2004 | Kim ..................... H02K 21/029 310/191 |
| 2005/0204732 | A1* | 9/2005 | Kouzu .................... F01N 3/222 60/307 |
| 2005/0264113 | A1* | 12/2005 | Suzuki .................. F16K 31/508 310/80 |
| 2006/0037310 | A1* | 2/2006 | Sakata ..................... F01N 3/30 60/289 |
| 2006/0243656 | A1* | 11/2006 | Ooiwa ................. B01D 29/014 210/497.1 |
| 2008/0035868 | A1* | 2/2008 | Okuda ............... F02M 25/0836 251/118 |
| 2009/0026399 | A1* | 1/2009 | Ishibashi ............. F16K 31/0613 251/129.15 |
| 2015/0279538 | A1* | 10/2015 | Toda ................... F16H 61/0021 335/255 |

(Continued)

FOREIGN PATENT DOCUMENTS

JP 2021174962 A 11/2021

*Primary Examiner* — Shawki S Ismail
*Assistant Examiner* — Lisa N Homza
(74) *Attorney, Agent, or Firm* — ROSSI, KIMMS & McDOWELL LLP

(57) ABSTRACT

A solenoid actuator 1 (1A, 1B) includes: a coil 3; a first stator 10 and a second stator 20 disposed with an air gap 11 therebetween in an axial direction so as to form a magnetic path 4 around the coil 3; and a mover 50 configured to move in the axial direction toward the second stator 20 from an original position radially inward of the first stator 10 by a magnetic force generated by energizing the coil 3. The first stator 10 includes: a first yoke 14; and a first cylindrical member 30 fixed to an inner peripheral side of the first yoke 14 and forming the air gap 11.

13 Claims, 8 Drawing Sheets

(56) References Cited

U.S. PATENT DOCUMENTS

2015/0330514 A1* 11/2015 Harada ............ B60K 15/03519
137/484.2
2016/0071640 A1* 3/2016 Kato .................... H01F 7/1615
335/229
2021/0343463 A1 11/2021 Amano

* cited by examiner

SOLENOID ACTUATOR AND METHOD FOR MANUFACTURING SOLENOID ACTUATOR

TECHNICAL FIELD

The present disclosure relates to a solenoid actuator and a method for manufacturing the solenoid actuator.

BACKGROUND

Conventionally, a solenoid actuator has been known in which a stator for forming a magnetic path around a coil is disposed and a mover can be moved in the axial direction by attracting the mover with a magnetic force generated by energizing the coil.

For example, Patent Document 1 describes an electromagnetic actuator that includes a first stator disposed on a stroke start position (original position) side of a movable element and a second stator disposed on a stroke end position side of the movable element.

In the electromagnetic actuator described in Patent Document 1, outer shapes of the movable element and the first stator are devised in order to achieve a constant attractive force characteristic over an entire length of a stroke of the movable element. More specifically, an outer peripheral surface of the movable element is provided with a tapered portion for narrowing a gap between the first stator and the movable element as the movable element moves toward the stroke end position. On the other hand, an end of the first stator on a second stator side is provided with a convex curved surface for widening the gap between the first stator and the movable element.

CITATION LIST

Patent Literature

Patent Document 1: JP2021-174962A

SUMMARY

Meanwhile, attraction characteristics of a solenoid actuator is affected not only by a gap between a stator and a mover, but also by an air gap between a first stator and a second stator. Therefore, in order to achieve desired attraction characteristics of the solenoid actuator, it is desired to control the air gap between the first stator and the second stator with high accuracy.

However, when there are many related parts determining the size of the air gap, the tolerance of each part becomes strict if the air gap between the first stator and the second stator is to be controlled with high accuracy, resulting in an increase in manufacturing cost of the solenoid actuator.

For example, in the electromagnetic actuator described in Patent Document 1, the first stator is fixed to a base and the second stator (cover member) is fixed to a case. Consequently, the air gap between the first stator and the second stator is affected by axial dimensions of the first stator and the second stator themselves, and axial dimensions of the base and the case. In the electromagnetic actuator described in Patent Document 1, the related parts determining the size of the air gap are the first stator, the second stator, the base, and the case, and the dimensional tolerances of these parts need to be reduced in order to control the air gap with high accuracy.

In view of the above, an object of at least some embodiments of the present invention is to provide a solenoid actuator that has excellent attraction characteristics and can be manufactured at low cost, and a method for manufacturing the solenoid actuator.

[1] A solenoid actuator according to at least some embodiments of the present invention, includes: a coil; a first stator and a second stator disposed with an air gap therebetween in an axial direction so as to form a magnetic path around the coil; and a mover configured to move in the axial direction toward the second stator from an original position radially inward of the first stator by a magnetic force generated by energizing the coil. The first stator includes: a first yoke; and a first cylindrical member fixed to an inner peripheral side of the first yoke and forming the air gap.

[2] In some embodiments, in the above configuration [1], the first cylindrical member includes: a magnetic tube formed of a magnetic material; and a non-magnetic layer formed on an inner peripheral surface of the magnetic tube, and the first cylindrical member is configured to guide the mover in the axial direction by bringing the mover into sliding contact with the non-magnetic layer.

[3] In some embodiments, in the above configuration [1] or [2], the first yoke has a first through hole into which the first cylindrical member is press-fitted, an inner wall of the first through hole includes: a contact region in contact with an outer peripheral surface of the first cylindrical member; and a non-contact region located adjacent to the contact region on a side opposite to the second stator across the contact region in the axial direction, and a diameter of the first through hole at the contact region is the same as that at the non-contact region.

[4] In some embodiments, in any one of the above configurations [1] to [3], the second stator includes: a second yoke; and a second cylindrical member fixed to an inner peripheral side of the second yoke and forming the air gap.

[5] In some embodiments, in the above configuration [4], the second cylindrical member is disposed so as to project from the second yoke toward the first stator.

[6] In some embodiments, in the above configuration [5], the second yoke decreases in thickness toward the air gap.

[7] A method for manufacturing a solenoid actuator according to at least some embodiments of the present invention, includes: a step of disposing a first yoke and at least a portion of a second stator around a coil; a step of positioning a first cylindrical member in an axial direction with respect to a reference surface of at least the portion of the second stator; a step of fixing the first cylindrical member positioned in the axial direction to an inner peripheral side of the first yoke such that a first stator formed by the first yoke and the first cylindrical member forms a magnetic path around the coil together with the second stator; and a step of assembling a mover to be located at an original position radially inward of the first stator.

According to at least some embodiments of the present invention, when assembling the first cylindrical member to the first yoke, the first cylindrical member is axially positioned with respect to the second stator, making it possible to reduce related parts that affect the air gap. Thus, the air gap can be controlled with high accuracy, and the solenoid actuator with excellent attraction characteristics can be realized at low cost.

DETAILED DESCRIPTION

Figure 1:
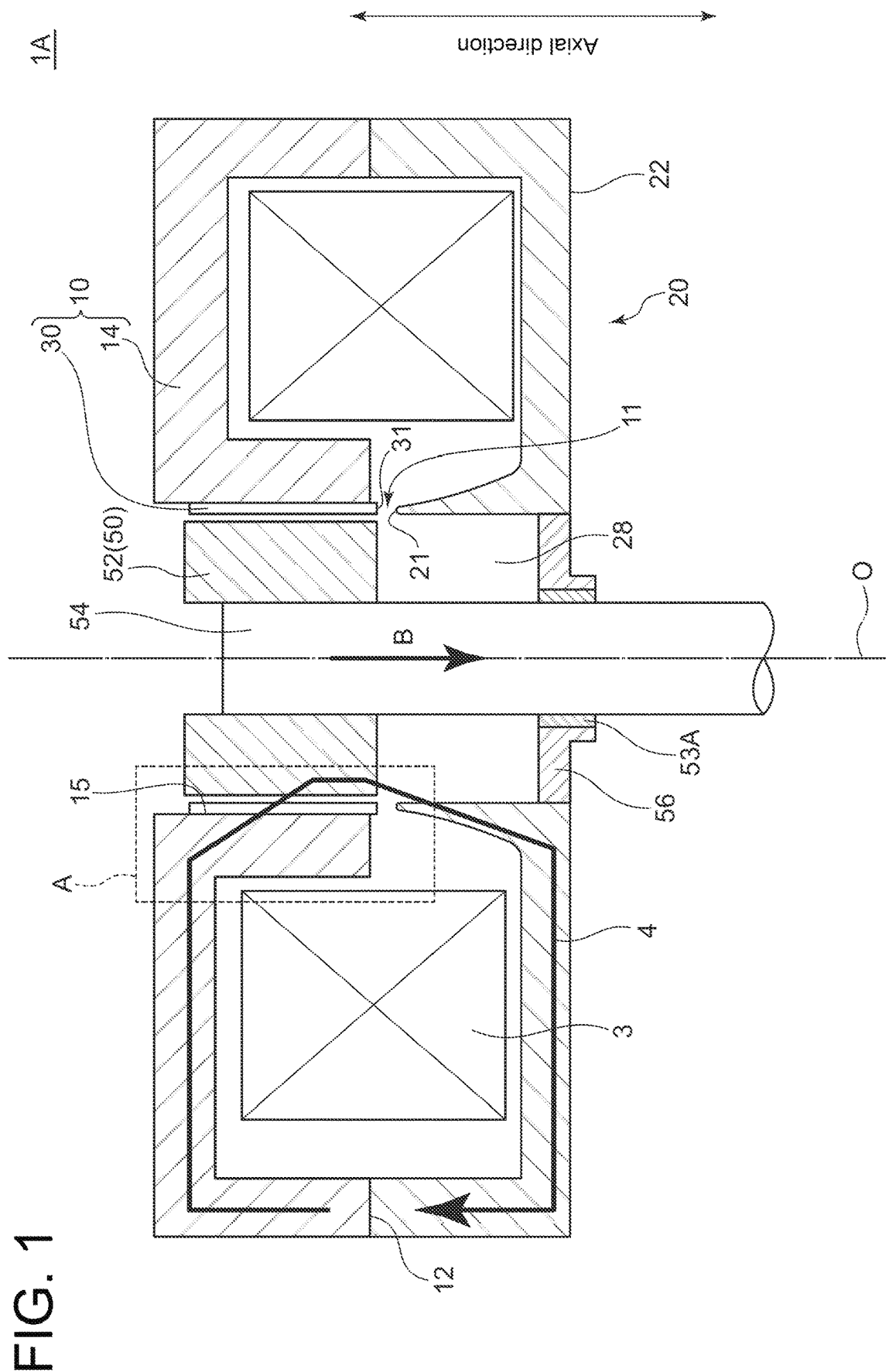
FIG. 1 is a cross-sectional view schematically showing the configuration of a solenoid actuator according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

Figure 2:
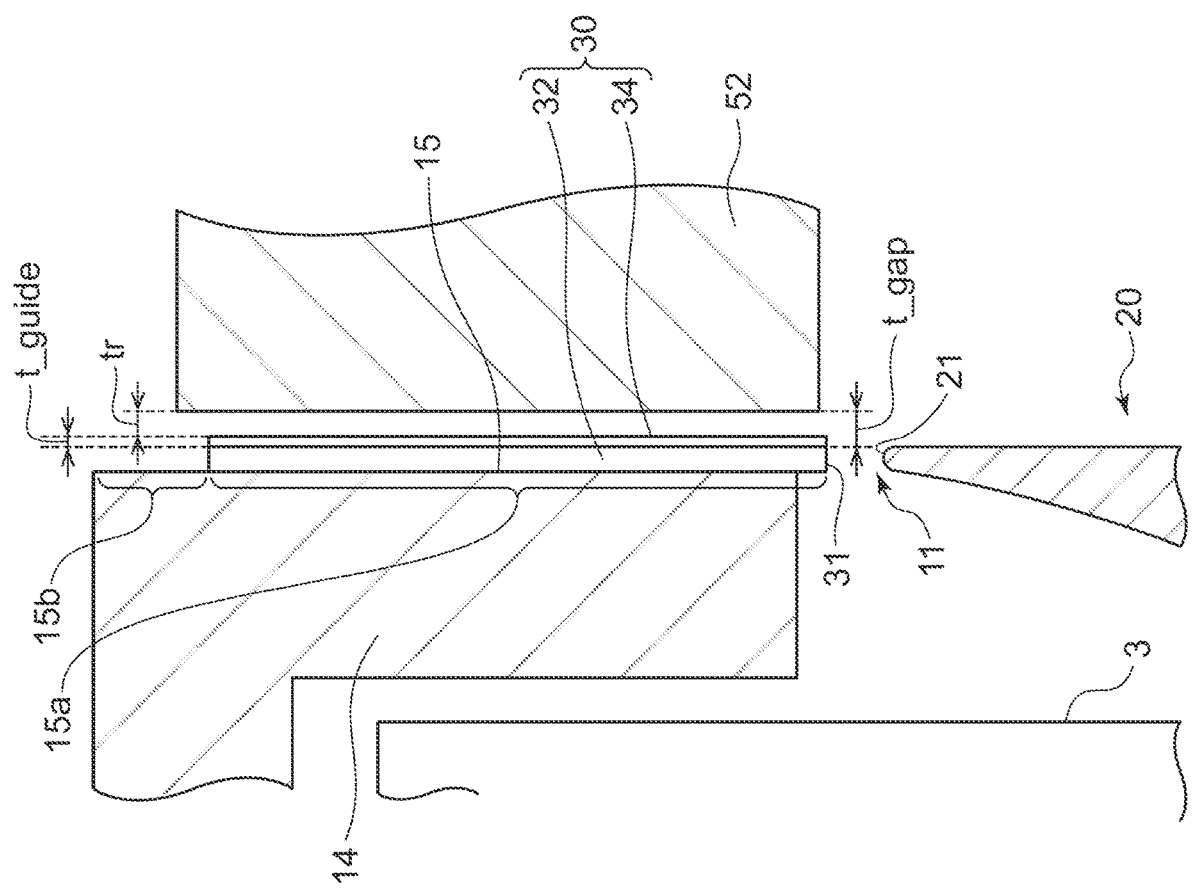
FIG. 2 is an enlarged view of an A section in FIG. 1.

FIG. 1 is a cross-sectional view schematically showing the configuration of a solenoid actuator according to an embodiment. FIG. 2 is an enlarged view of an A section in FIG. 1.

Figure 3:
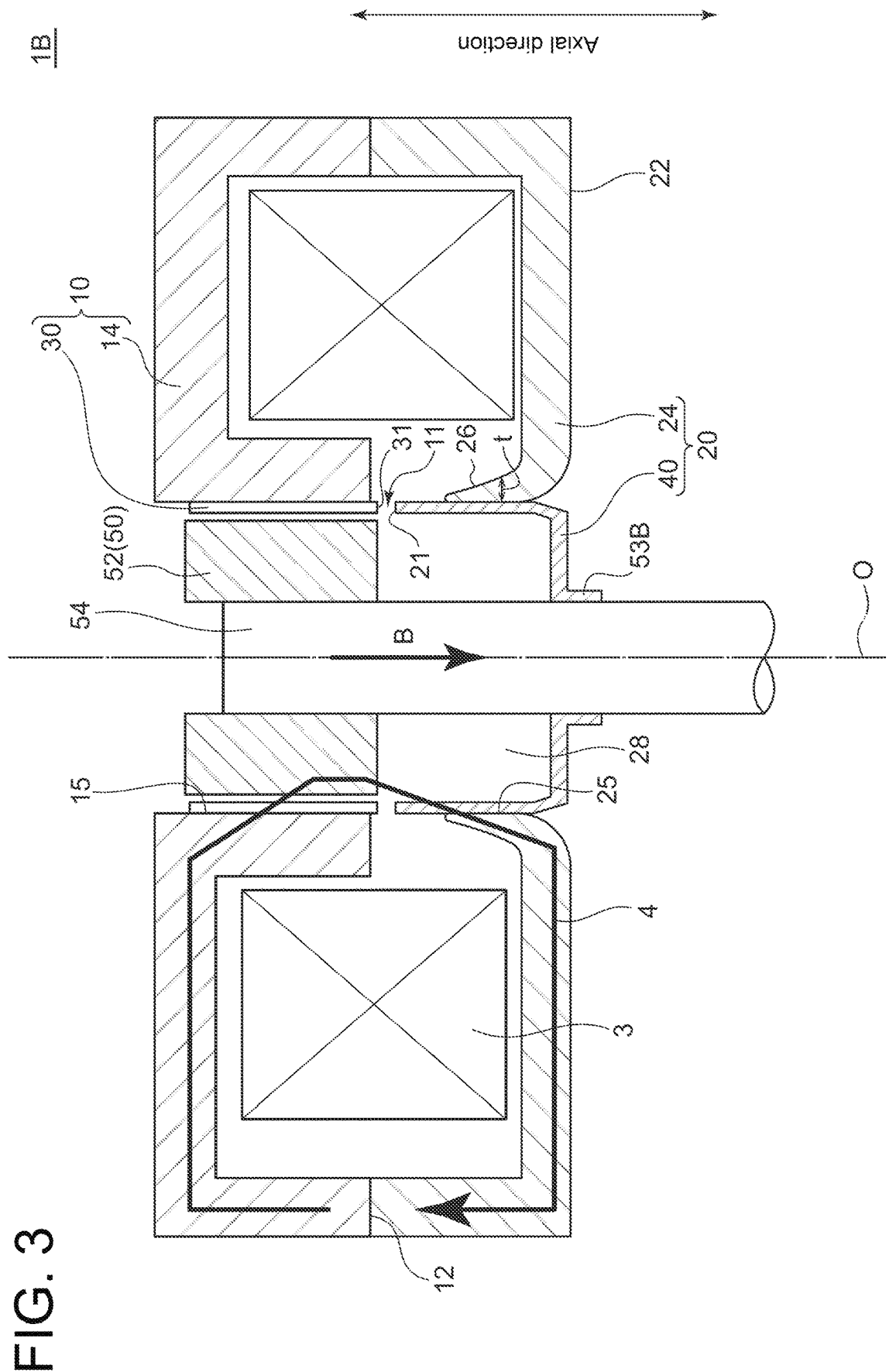
FIG. 3 is a cross-sectional view schematically showing the configuration of the solenoid actuator according to another embodiment.

FIG. 3 is a cross-sectional view schematically showing the configuration of the solenoid actuator according to another embodiment.

Herein, FIGS. 1 and 3 omit illustration of a resin mold of the solenoid actuator.

FIGS. 1 and 3 each show a state where a coil 3 is in a non-excited state and a mover 50 exists at an original position. The original position of the mover 50 can be rephrased as a stroke start position where a stroke amount of a solenoid actuator 1A, 1B is zero. Further, FIGS. 1 and 3 each show a magnetic path 4 only for one side of the coil 3 (a left-hand area in the figure), but the same magnetic path 4 is formed on either side (a right-hand area in the figure) of the annularly disposed coil 3 as well.

Hereinafter, the solenoid actuators 1A and 1B may collectively be referred to as the solenoid actuator 1.

In some embodiments, as shown in FIGS. 1 and 3, the solenoid actuator 1 (1A, 1B) includes the coil 3, a stator 10, 20 for forming the magnetic path 4 around the coil 3, and the mover 50 axially movable by a magnetic force generated by the coil 3.

The coil 3 is formed by winding a wire composed of a conductor such as copper or copper alloy around a central axis O of the solenoid actuator 1. The coil 3 has a substantially annular shape centering on the central axis O as a whole. The coil 3 is electrically connected to a terminal (not shown), and power is supplied to the coil 3 via the terminal. When the coil 3 is energized, a magnetic force for attracting the mover 50 is generated.

The coil 3 may be housed in a bobbin (not shown).

The stator (10, 20) includes the first stator 10 and the second stator 20 located on both sides of the coil 3 in the axial direction of the solenoid actuator 1. The stator (10, 20) is composed of a magnetic material that may be, for example, iron and is disposed annularly around the central axis O so as to surround the coil 3.

The first stator 10 and the second stator 20 are arranged so as to face each other across an air gap 11 in the axial direction, on an inner peripheral side of the coil 3 and an outer peripheral side of the mover 50 described later.

The air gap 11 is provided to restrict a magnetic flux flow from the first stator 10 directly toward the second stator 20 without via the mover 50, and to efficiently flow a magnetic flux in the magnetic path 4 from the first stator 10 toward the second stator 20 via the mover 50.

In the examples shown in FIGS. 1 and 3, the first stator 10 and the second stator 20 are in contact with each other at a contact section 12 located on an outer peripheral side of the coil 3.

In this case, the first stator 10 and the second stator 20 may integrally be formed by the resin mold (not shown) in a state where the first stator 10 and the second stator 20 face each other via the air gap 11 on the inner peripheral side of the coil 3 and are in contact with each other at the contact section 12 on the outer peripheral side of the coil 3.

The position of the contact section 12 between the first stator 10 and the second stator 20 is not particularly limited, but the contact section 12 may be located at a central position of the coil 3 in the axial direction as in the examples of FIGS. 1 and 3, or the contact section 12 may exist at a position different from the central position of the coil 3.

In another embodiment, the solenoid actuator 1 does not have a section where the first stator 10 and the second stator 20 contact each other.

For example, if the solenoid actuator 1 includes at least one another stator other than the first stator 10 and the second stator 20, the at least one another stator may be located between the first stator 10 and the second stator 20, and may form the magnetic path 4 together with the first stator 10 and the second stator 20. The another stator is thus interposed between the first stator 10 and the second stator 20, which may obtain the configuration where the first stator 10 and the second stator 20 do not directly contact each other.

Further, voids may exist between the plurality of stators including the first stator 10 and the second stator 20.

In some embodiments, as shown in FIGS. 1 to 3, the first stator 10 includes a first yoke 14 and a first cylindrical member 30 fixed to an inner peripheral side of the first yoke 14.

In some embodiments, as shown in FIGS. 1 to 3, the first cylindrical member 30 axially faces the second stator 20 across the air gap 11 between the first stator 10 and the second stator 20. More specifically, a distal end 31 of the first cylindrical member 30 is not in contact with a distal end 21 of the second stator 20, but is separated from the second stator 20 by the air gap 11.

Herein, the air gap 11 means a minimum gap on the inner peripheral side of the coil 3, and between the second stator 20 and the first stator 10 including the first yoke 14 and the first cylindrical member 30.

The first cylindrical member 30 may be disposed such that the distal end 31 of the first cylindrical member 30 is located in a radial position range overlapping the distal end 21 of the second stator 20.

Further, the first cylindrical member 30 may be disposed such that the distal end 31 projects from the first yoke 14 toward the second stator 20.

If the first stator 10 thus includes the first yoke 14 and the first cylindrical member 30, it becomes easier to control the air gap 11 with high accuracy.

That is, when assembling the first cylindrical member 30 to the first yoke 14, the first cylindrical member 30 is axially positioned with respect to the second stator 20, making it possible to reduce related parts that affect the air gap 11. Thus, the air gap 11 can be controlled with high accuracy, and the solenoid actuator 1 with excellent attraction characteristics can be realized at low cost.

For example, consider a case where, when assembling the first cylindrical member 30 to the first yoke 14, the axial position of the distal end 31 of the first cylindrical member 30 is adjusted with reference to an axial end surface 22 of the second stator 20 (the reference surface 22 of the second stator 20) opposite to the first stator 10. In this case, since only the dimension of the second stator 20 (the axial dimension of the second stator 20 from the reference surface 22 to the distal end 21) substantially affects the air gap 11, the highly accurate air gap 11 can easily be formed.

Specific examples of axial positioning of the first cylindrical member 30 with respect to the first yoke 14 will be described in detail later with reference to FIGS. 4A and 4B, and FIGS. 5A and 5B.

The first yoke 14 of the first stator 10 is formed of a magnetic material that may be, for example, iron and is disposed so as to surround the coil 3 (cover the annular coil 3) together with the second stator 20. The first yoke 14 may contact the second stator 20 at the contact section 12 on the outer peripheral side of the coil 3.

The first yoke 14 has a first through hole 15 for receiving the first cylindrical member 30. The first through hole 15 may be a circular hole concentric with the central axis O of the solenoid actuator 1.

As shown in FIG. 2, an inner wall of the first through hole 15 of the first yoke 14 includes a contact region 15a which is in contact with an outer peripheral surface of the first cylindrical member 30 and a non-contact region 15b which is not in contact with the outer peripheral surface of the first cylindrical member 30. The non-contact region 15b is adjacent to the contact region 15a in the axial direction. The non-contact region 15b is located opposite to the second stator 20 across the contact region 15a in the axial direction.

In some embodiments, an inner diameter of the first through hole 15 at the contact region 15a is the same as that at the non-contact region 15b. That is, the inner wall of the first through hole 15 is not provided with a step that restricts the axial position of the first cylindrical member 30 with respect to the first yoke 14. Thus, the step of the inner wall of the first through hole 15 does not hinder the axial positioning of the first cylindrical member 30 with respect to the second stator 20.

Accordingly, when assembling the first cylindrical member 30 to the first yoke 14, it is possible to appropriately adjust the axial position of the distal end 31 of the first cylindrical member 30 and it becomes easier to control the air gap 11 with high accuracy.

In the exemplary embodiment shown in FIG. 2, the inner wall of the first through hole 15 is composed only of the contact region 15a and the non-contact region 15b, and the inner diameter of the first through hole 15 is constant regardless of the axial position.

In another embodiment, the inner wall of the first through hole 15 includes, in addition to the contact region 15a and the non-contact region 15b, another region different in inner diameter from the contact region 15a and the non-contact region 15b.

The first cylindrical member 30 is disposed in the first through hole 15 and fixed to the inner peripheral side of the first yoke 14.

A means for fixing the first cylindrical member 30 to the first yoke 14 is not particularly limited and, for example, the first cylindrical member 30 may be press-fitted into the first through hole 15 or the first cylindrical member 30 may be welded to the inner wall of the first through hole 15. Alternatively, an entire circumference or part of the section, where the first cylindrical member 30 and the inner wall of the first through hole 15 overlap each other, may be crimped by spot crimping.

In some embodiments, as shown in FIG. 2, the first cylindrical member 30 includes a magnetic tube 32 with an outer peripheral surface contacting the inner wall of the first through hole 15 of the first yoke 14, and a non-magnetic layer 34 formed on an inner peripheral surface of the magnetic tube 32.

The magnetic tube 32 is composed of a magnetic material that may be, for example, iron, and the magnetic tube 32 faces the second stator 20 across the air gap 11. That is, the magnetic tube 32 of the magnetic portion of the first stator 10 including the first yoke 14 and the first cylindrical member 30 is disposed closest to the distal end 21 of the second stator 20.

A radial position range of the magnetic tube 32 may overlap the radial position range of the distal end 21 of the second stator 20 that forms the air gap 11 with the magnetic tube 32.

The non-magnetic layer 34 of the first cylindrical member 30 is disposed on the inner peripheral surface of the magnetic tube 32 so as to face the outer peripheral surface of the mover 50.

Whereby, the first cylindrical member 30 can axially guide the mover 50 by bringing the mover 50 into sliding contact with the non-magnetic layer 34.

The non-magnetic layer 34 may be composed of a low-friction material such as copper or PTFE (polytetrafluoroethylene). The non-magnetic layer 34 may be deposited on the inner surface of the first cylindrical member 30 by an application method such as sintering or impregnation, for example. In the exemplary embodiment, the non-magnetic layer 34 is formed by impregnating a copper alloy porous layer formed by sintering with a resin material containing PTFE.

Thus, by providing the non-magnetic layer 34 on the inner peripheral surface of the magnetic tube 32 and allowing the first cylindrical member 30 for forming the air gap 11 to also serve as a guide for the mover 50, it is possible to achieve high accuracy of the air gap 11 while suppressing the increase in number of parts.

In general, a guide (bearing) for constraining a radial position of a mover and axially guiding the mover is disposed at a location separate from a radial magnetic gap between a yoke and the mover. In this case, if the axis of the yoke is eccentric with respect to the guide for regulating the radial position of the mover, the magnetic gap between the mover and the yoke on an outer peripheral side of the mover is also affected by the eccentricity. Therefore, it is necessary to secure a relatively wide magnetic gap between the mover and the yoke on the outer peripheral side of the mover, taking into account the influence of misalignment of the yoke with respect to the guide (bearing).

In this regard, as in the exemplary embodiment shown in FIG. 2, if the first cylindrical member 30 having the guide function for axially guiding the mover 50 is fixed to the inner peripheral side of the first yoke 14, it is possible to substantially eliminate the influence of misalignment of the first yoke 14 with respect to the guide (first cylindrical member 30). Therefore, a radial clearance tr to be secured between the first cylindrical member 30 and the mover 50 is sufficient to have a size that allows for assembly of the mover 50. As a result, the magnetic flux from the first yoke 14 toward the mover 50 can be increased by decreasing a magnetic gap t_gap.

In the example of FIG. 2, the magnetic gap t_gap regarding the magnetic flux flow from the first stator 10 toward the mover 50 is the sum of the above-described radial clearance tr and a thickness t_guide of the non-magnetic layer 34.

In some embodiments, as shown in FIG. 3, the second stator 20 includes a second yoke 24 and a second cylindrical member 40 fixed to an inner peripheral side of the second yoke 24.

The second yoke 24 is formed of a magnetic material that may be, for example, iron and is disposed so as to surround the coil 3 together with the first stator 10. The second yoke 24 may contact the first stator 10 at the contact section 12 on the outer peripheral side of the coil 3.

The second yoke 24 has a second through hole 25 for receiving the second cylindrical member 40. The second through hole 25 may be a circular hole concentric with the central axis O of the solenoid actuator 1.

In the exemplary embodiment shown in FIG. 3, the second cylindrical member 40 has the distal end 21 of the second stator 20 forming the air gap 11 with the first stator 10.

By thus providing the second cylindrical member 40 of the second stator 20 directly related to the air gap 11 separately from the second yoke 24, it becomes easier to control the air gap 11 with higher accuracy, as compared with a case where the entire second stator 20 is configured as one piece.

For example, consider a case where, when assembling the first cylindrical member 30 to the first yoke 14, the position of the distal end 31 of the first cylindrical member 30 is adjusted with reference to the reference surface 22 of the second stator 20 (that is, the axial end surface 22 of the second yoke 24 opposite to the first stator 10). In this case, after adjusting the axial position of the distal end 31 of the first cylindrical member 30 with respect to the axial end surface 22 of the second yoke 24, the second cylindrical member 40 may axially be aligned with respect to the axial end surface 22 of the second yoke 24 when assembling the second cylindrical member 40 to the second yoke 24. Consequently, since only the dimension of the second cylindrical member 40 of the second stator 20 (the axial dimension of the second cylindrical member 40 from the reference surface 22 of the second yoke 24 to the air gap 11) substantially affects the air gap 11, the highly accurate air gap 11 can easily be formed.

Axial positioning of the second cylindrical member 40 with respect to the second yoke 24 will be described in detail later with reference to FIG. 5C.

In some embodiments, as shown in FIG. 3, the second cylindrical member 40 is disposed so as to project from the second yoke 24 toward the first stator 10.

That is, the distal end 21 of the second stator 20 formed by the second cylindrical member 40 is located on the first stator 10 side beyond the distal end of the second yoke 24 in the axial direction.

Some solenoid actuator, such as a linear solenoid, is desirably configured such that a change in attractive force with respect to a current has a linear characteristic. In order to achieve this linear characteristic, the distal end of the second stator, which is disposed downstream in a moving direction of the mover from the original position when the coil is energized, advantageously has a shape tapered toward the air gap.

In this regard, as described above, by axially projecting the second cylindrical member 40 forming the air gap 11 from the second yoke 24, the overall shape of the second stator 20 formed by the second yoke 24 and the second cylindrical member 40 can be made closer to the above-described tapered shape.

In the exemplary embodiment shown in FIG. 3, the second yoke 24 decreases in thickness t toward the air gap 11. That is, the second yoke 24 has a tapered portion 26 with the thickness t decreasing toward the air gap 11, in a distal end region on the air gap 11 side.

Herein, the thickness t of the second yoke 24 is the radial dimension of the second yoke 24.

Since the second yoke 24 thus has a thickness distribution decreasing toward the air gap 11, in combination with the configuration where the second cylindrical member 40 projects from the second yoke 24 toward the first stator 10, the overall shape of the second stator 20 can be made much closer to the aforementioned tapered shape.

When the coil 3 is energized, a magnetic flux flows in the magnetic path 4 formed around the coil 3 by the first stator 10 and the second stator 20 each having the above configuration. The magnetic path 4 includes not only the first stator 10 (the first yoke 14 and the first cylindrical member 30) and the second stator 20, but also the mover 50. Thus, the mover 50 is attracted by the magnetic flux flowing through the magnetic path 4 and axially moves toward the second stator 20 from the original position radially inward of the first stator 10.

The second stator 20 forms a cavity 28, which is configured to receive the mover 50 axially approaching when the coil 3 is energized, radially inward of the second stator 20.

In the embodiment shown in FIG. 1, the cavity 28 is defined by the second stator 20 which is the one piece. In the embodiment shown in FIG. 3, the cavity 28 is defined by the second cylindrical member 40 of the second stator 20.

In some embodiments, as shown in FIGS. 1 and 3, the mover 50 is a plunger 52 disposed at an end portion of a shaft 54 which is an output shaft of the solenoid actuator 1.

The plunger 52 has a through hole into which the shaft 54 is press-fitted. The shaft 54 is press-fitted into the through hole of the plunger 52 such that the axis of the shaft 54 and the axis of the plunger 52 are aligned.

The plunger 52 as the mover 50 is formed of a magnetic material that may be, for example, iron and is mounted on an outer peripheral side of the shaft 54.

The plunger 52 has a diameter which is larger than a diameter of the shaft 54 and is smaller than an inner diameter of first cylindrical member 30 of first stator 10. Further, the diameter of the plunger 52 is smaller than the diameter of the cavity 28 formed by the second stator 20.

When the coil 3 is in the non-excited state, the shaft 54 is biased by a spring (not shown) in a direction opposite to an arrow B, and the plunger 52 as the mover 50 is located radially inward of the first stator 10 (first cylindrical member 30). At this time, it is only necessary that the plunger 52 is substantially be located radially inward of the first cylindrical member 30, and the end portion of the plunger 52 may project from the first stator 10 (first cylindrical member 30) toward the second stator 20.

On the other hand, when the coil 3 is energized, the plunger 52 as the mover 50 intrudes in the cavity 28 formed radially inward of the second stator 20. At this time, it is only necessary that at least a portion of the plunger 52 is located within the cavity 28, and a remaining portion of the plunger 52 may project from the cavity 28 toward the first stator 10.

The shaft 54 to which the plunger 52 having the above configuration is fixed penetrates the second stator 20 and extends to the outside of the solenoid actuator 1. The shaft 54 is moved in the direction of the arrow B by the actuation of the solenoid actuator 1, and transmits a driving force of the solenoid actuator 1 to an external device (not shown).

The external device driven by the solenoid actuator 1 is not particularly limited, but may be, for example, a spool for hydraulically controlling a valve timing of an intake valve or an exhaust valve of a vehicle engine.

The shaft 54 may slidably be supported on the second stator 20 side by a bearing.

In the embodiment shown in FIG. 1, the solenoid actuator 1 includes a bearing 53A for slidably supporting the shaft 54 on the second stator 20. The bearing 53A may be mounted on the second stator 20 via a bearing holder 56.

In the embodiment shown in FIG. 3, a radially inner portion of the second cylindrical member 40 forming part of the second stator 20 functions as a bearing portion 53B, and the shaft 54 is slidably supported by the bearing portion 53B of the second cylindrical member 40.

Next, a method for manufacturing the solenoid actuator 1 (1A, 1B) will be described with reference to FIGS. 4A to 5D.

Figure 4A:
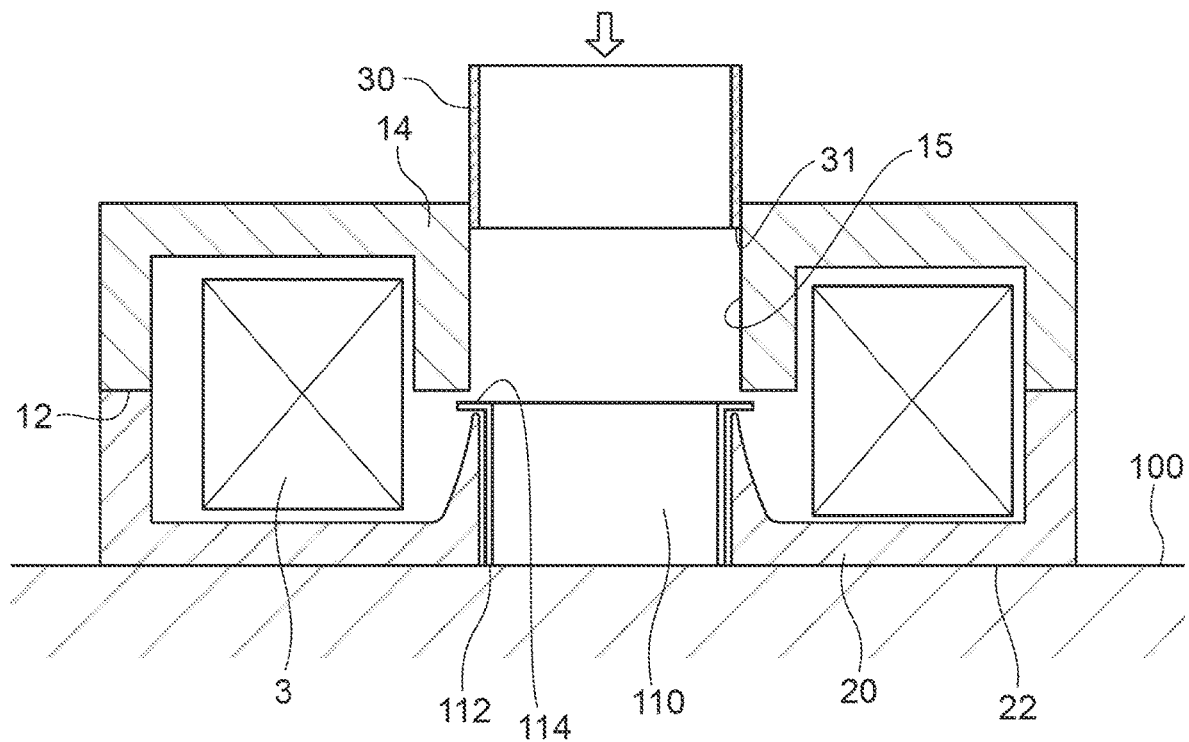
FIG. 4A is a view showing an assembly procedure for the solenoid actuator according to an embodiment.
Figure 4B:
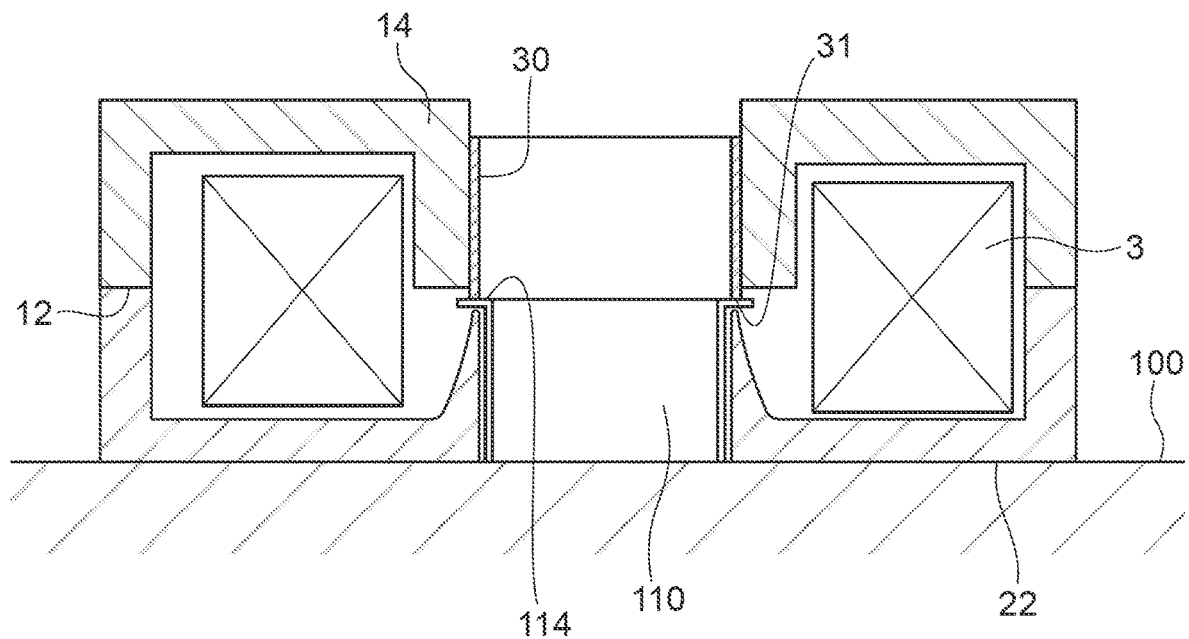
FIG. 4B is a view showing the assembly procedure for the solenoid actuator according to an embodiment.
Figure 4C:
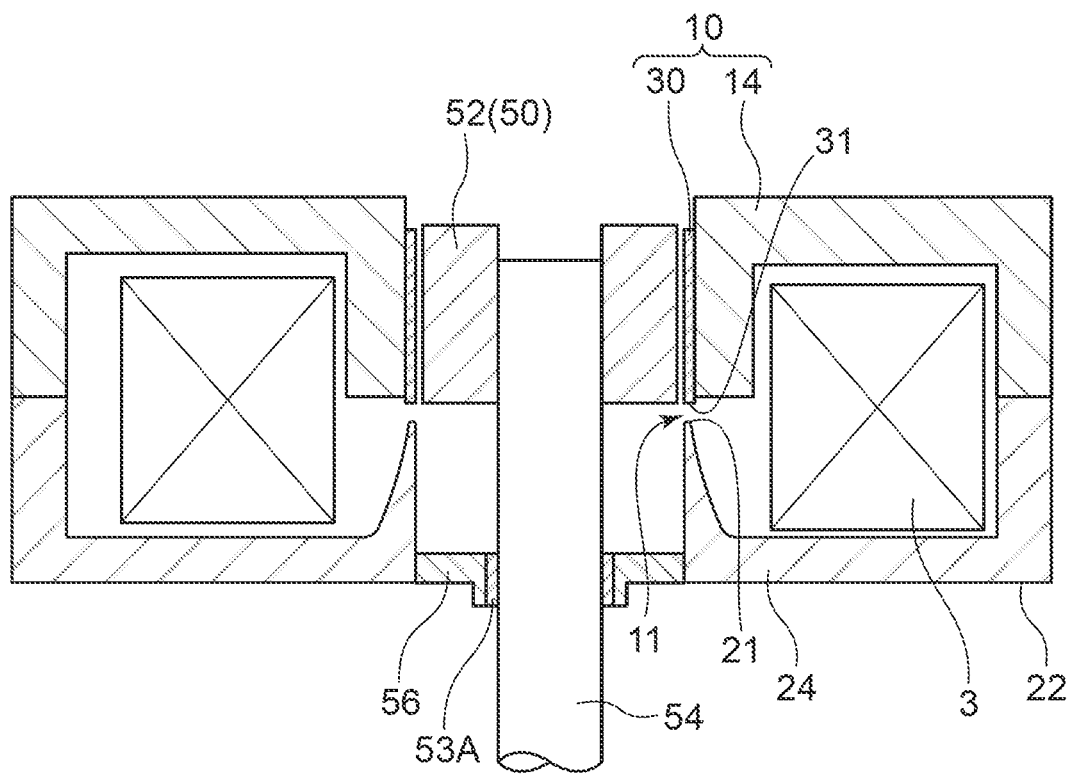
FIG. 4C is a view showing the assembly procedure for the solenoid actuator according to an embodiment.

FIGS. 4A to 4C are each a view showing an assembly procedure for the solenoid actuator 1A according to an embodiment.

When assembling the solenoid actuator 1A, the first yoke 14 and the second stator 20 are disposed around the coil 3. Thereafter, as shown in FIGS. 4A and 4B, the first cylindrical member 30 is axially positioned with respect to the reference surface 22 of the second stator 20.

When positioning the first cylindrical member 30, a jig 110 may be used to achieve a state in which the distal end 31 of the first cylindrical member 30 exists at a desired axial position with respect to the reference surface 22.

In the embodiment shown in FIG. 4A, prior to inserting the first cylindrical member 30 into the first through hole 15 of the first yoke 14, the jig 110 having a substantially cylindrical shape is disposed on the inner peripheral side of the second stator 20. At this time, the reference surface 22 of the second stator 20 and a lower end surface 112 of the jig 110 are brought into contact with an upper surface (flat surface 100) of a base. In this case, an upper end surface 114 of the jig 110 exists at a position higher than the reference surface 22 of the second stator 20 by the dimension of the jig 110.

Thereafter, as shown in FIG. 4A, the first cylindrical member 30 is inserted into the first through hole 15 of the first yoke 14 from the side opposite to the second stator 20. When the distal end 31 of the first cylindrical member 30 contacts the upper end surface 114 of the jig 110, as shown in FIG. 4B, the insertion of the first cylindrical member 30 is stopped.

The first cylindrical member 30 is thus axially positioned with respect to the reference surface 22 of the second stator 20.

The positioned first cylindrical member 30 is fixed to the inner peripheral side of the first yoke 14 so as not to move with respect to the first yoke 14. As a result, the magnetic path 4 (see FIG. 1) is formed around the coil 3 by the second stator 20 and the first stator 10 including the first yoke 14 and the first cylindrical member 30.

The first cylindrical member 30 can be fixed to the first yoke 14 by press fitting or welding. When the first cylindrical member 30 is press-fitted into the first through hole 15 of the first yoke 14, the fixing of the first cylindrical member 30 to the first yoke 14 and the positioning of the first cylindrical member 30 described above are performed simultaneously. By contrast, when the first cylindrical member 30 is fixed to the first yoke 14 by welding, the first cylindrical member 30 is fixed to the first yoke 14 after the positioning of the first cylindrical member 30.

After the positioning and the fixing of the first cylindrical member 30 are completed, the jig 110 is removed by any method.

For example, if the jig 110 has a structure that can be disassembled, the jig 110 may be disassembled into a plurality of parts, and then each part may be taken out from the opening of the second stator 20. Alternatively, if the jig 110 has a deformable structure, the jig 110 may be deformed such that the dimension of the jig 110 is reduced, and then the jig 110 may be taken out from the opening of the second stator 20.

Thereafter, as shown in FIG. 4C, the plunger 52 as the mover 50 is assembled to the first stator 10 and the second stator 20.

The axial position of the mover 50 (plunger 52) at this stage is not particularly limited. By assembling a spring (not shown), the mover 50 (plunger 52) may be mounted so as to be located at the original position radially inward of the first stator 10 (first cylindrical member 30).

Further, in the example shown in FIG. 4C, the shaft 54 is slidably supported by the bearing 53A, by assembling the bearing 53A to the second stator 20 via the bearing holder 56.

Thereafter, the first stator 10 and the second stator 20 are integrally molded by the resin mold (not shown), making it possible to obtain the solenoid actuator 1A.

FIGS. 5A to 5D are each a view showing an assembly procedure for the solenoid actuator 1B according to another embodiment.

Figure 5A:
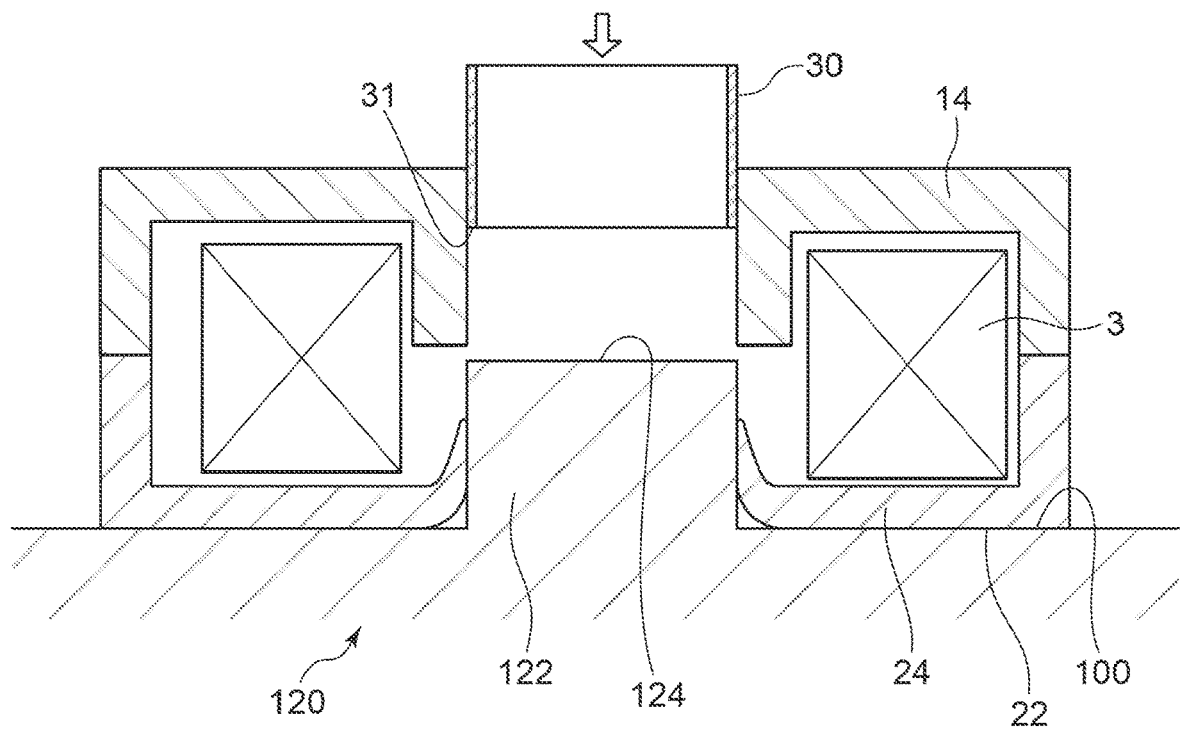
FIG. 5A is a view showing an assembly procedure for the solenoid actuator according to another embodiment.

In another embodiment, first, the first yoke 14 and the second yoke 24, which is part of the second stator 20, are disposed around the coil 3 (see FIG. 5A). Then, the first cylindrical member 30 is axially positioned with respect to the reference surface 22 of the second yoke 24.

When positioning the first cylindrical member 30, a jig 120 may be used to achieve a state in which the distal end 31 of the first cylindrical member 30 exists at a desired axial position with respect to the reference surface 22.

In the embodiment shown in FIG. 5A, prior to inserting the first cylindrical member 30 into the first through hole 15 of the first yoke 14, the jig 120 for positioning the first cylindrical member 30 is installed in advance.

The jig 120 has the flat surface 100 and a projection 122 having a substantially cylindrical shape. The projection 122 is located on an inner peripheral side of the flat surface 100 and disposed to project upward from the flat surface 100. The jig 120 is installed such that the flat surface 100 of the jig 120 contacts the reference surface 22 of the second yoke 24 and the projection 122 of the jig 120 is located on the inner peripheral side of the second yoke 24. At this time, an upper end surface 124 of the projection 122 of the jig 120 exists at a position higher than the reference surface 22 of the second yoke 24 by the projection amount of the projection 122 from the flat surface 100.

Figure 5B:
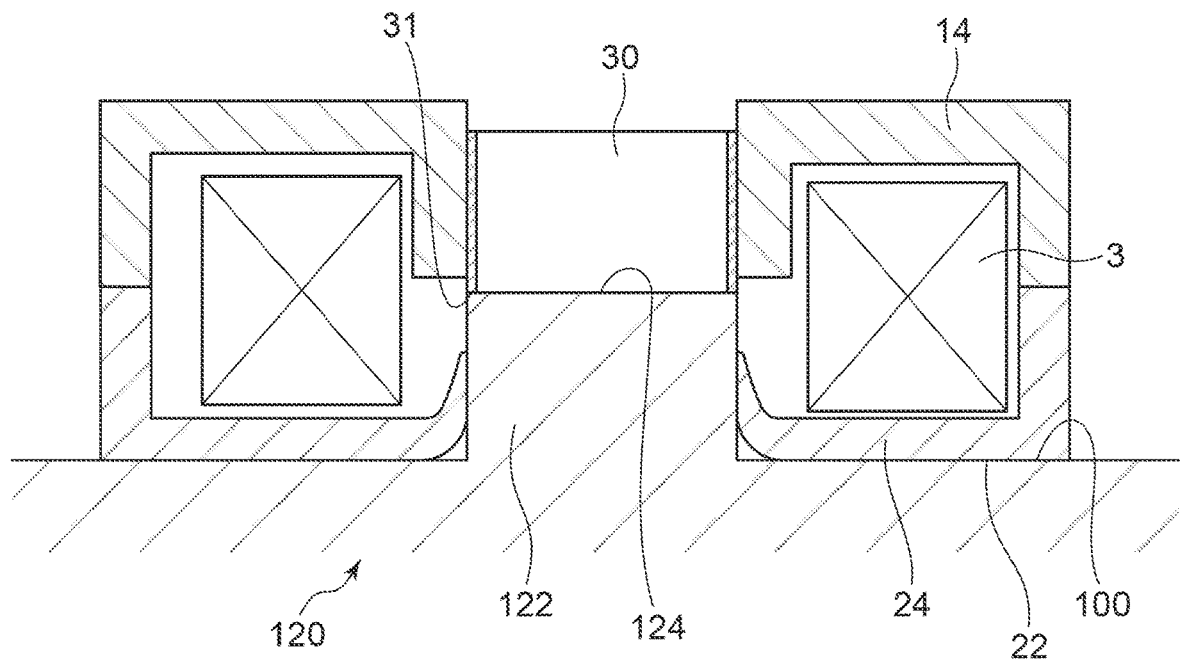
FIG. 5B is a view showing the assembly procedure for the solenoid actuator according to another embodiment.

Thereafter, as shown in FIG. 5A, the first cylindrical member 30 is inserted into the first through hole 15 of the first yoke 14 from the side opposite to the second yoke 24. When the distal end 31 of the first cylindrical member 30 contacts the upper end surface 124 of the projection 122 of the jig 120, as shown in FIG. 5B, the insertion of the first cylindrical member 30 is stopped.

The first cylindrical member 30 is thus axially positioned with respect to the reference surface 22 of the second yoke 24 constituting part of the second stator 20.

Thereafter, the positioned first cylindrical member 30 is fixed to the inner peripheral side of the first yoke 14 so as not to move with respect to the first yoke 14.

The first cylindrical member 30 can be fixed to the first yoke 14 by press fitting or welding. When the first cylindrical member 30 is press-fitted into the first through hole 15 of the first yoke 14, the fixing of the first cylindrical member 30 to the first yoke 14 and the positioning of the first cylindrical member 30 described above are performed simultaneously.

Figure 5C:
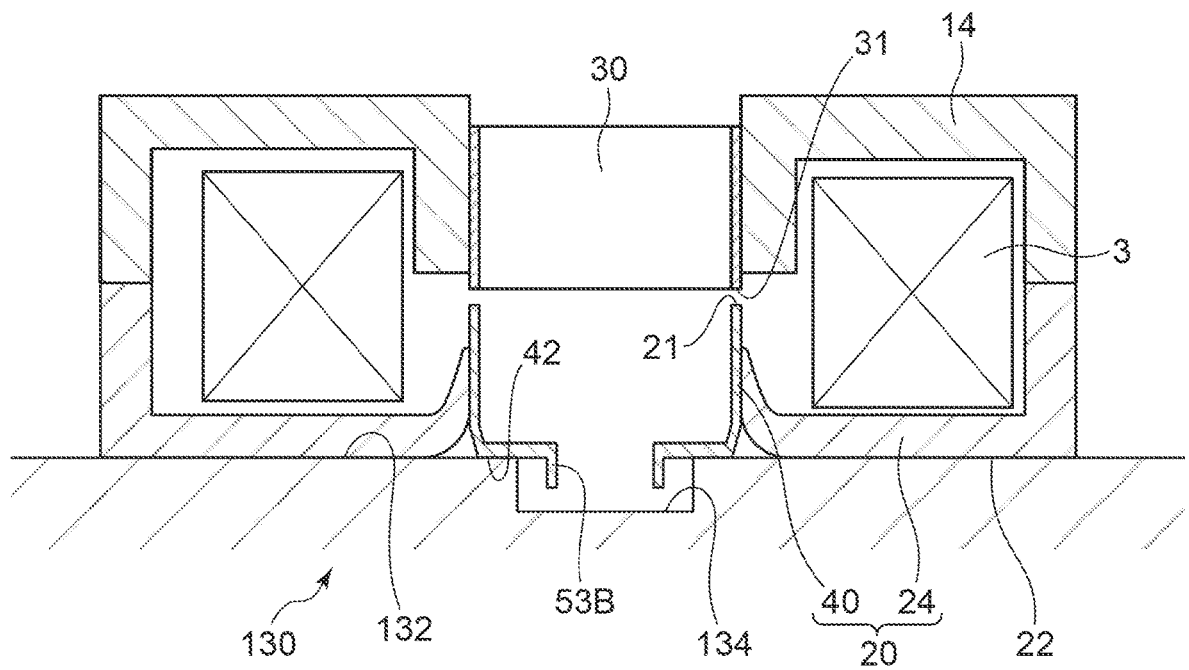
FIG. 5C is a view showing the assembly procedure for the solenoid actuator according to another embodiment.

Next, as shown in FIG. 5C, the second cylindrical member 40 constituting part of the second stator 20 is inserted into the second through hole 25 of the second yoke 24, and the second cylindrical member 40 is positioned and fixed with respect to the second yoke 24.

Herein, when positioning the second cylindrical member 40, a jig 130 may be used to achieve a state in which the distal end of the second cylindrical member 40 (that is, the distal end 21 of the second stator 20) exists at a desired axial position with respect to the reference surface 22 of the second yoke 24.

The jig 130 has a flat surface 132 and a recess 134 surrounded by the flat surface 132. The depth of the recess 134 is set to a dimension capable of receiving the bearing portion 53B of the second cylindrical member 40. The jig 130 is installed such that the flat surface 132 of the jig 130 contacts the reference surface 22 of the second yoke 24 and a shoulder portion 42 of the second cylindrical member 40.

By thus bringing the reference surface 22 of the second yoke 24 and the shoulder portion 42 of the second cylindrical member 40 into contact with the flat surface 132 of the jig 130, the distal end of the second cylindrical member 40 (that is, the distal end 21 of the second stator 20) is axially positioned with respect to the second yoke 24.

The second cylindrical member 40 thus positioned is fixed to the inner peripheral side of the second yoke 24 so as not to move with respect to the second yoke 24. As a result, the magnetic path 4 (see FIG. 3) is formed around the coil 3 by the first stator 10 (the first yoke 14 and the first cylindrical member 30) and the second stator 20 (the second yoke 24 and the second cylindrical member 40).

The second cylindrical member 40 can be fixed to the second yoke 24 by press fitting or welding. When the first cylindrical member 30 is press-fitted into the first through hole 15 of the first yoke 14, the fixing of the first cylindrical member 30 to the first yoke 14 and the positioning of the first cylindrical member 30 described above are performed simultaneously.

Figure 5D:
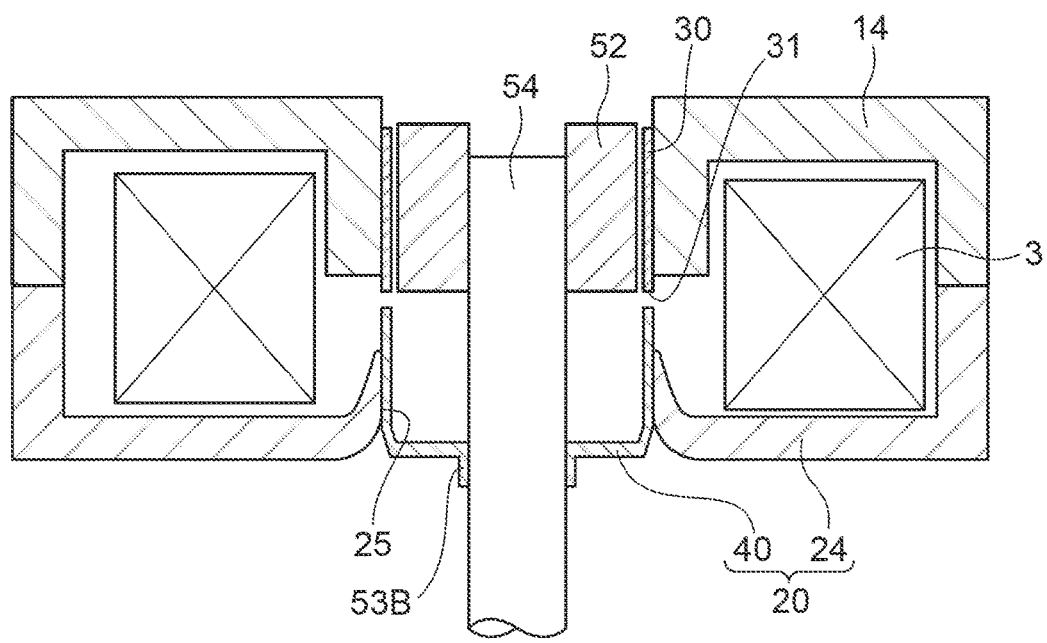
FIG. 5D is a view showing the assembly procedure for the solenoid actuator according to another embodiment.

Thereafter, as shown in FIG. 5D, the plunger 52 as the mover 50 is assembled to the first stator 10 and the second stator 20.

The axial position of the mover 50 (plunger 52) at this stage is not particularly limited. By assembling a spring (not shown), the mover 50 (plunger 52) may be mounted so as to be located at the original position radially inward of the first stator 10 (first cylindrical member 30).

Further, in the example shown in FIG. 5D, the shaft 54 is slidably supported by the second cylindrical member 40 of the second stator 20.

Finally, the first stator 10 and the second stator 20 are integrally molded by the resin mold (not shown), making it possible to obtain the solenoid actuator 1B.

According to the above-described method described with reference to FIGS. 4A to 5D, when assembling the first cylindrical member 30 to the first yoke 14, the first cylindrical member 30 is axially positioned with respect to the reference surface 22 of the second stator 20, making it possible to reduce related parts that affect the air gap 11. Thus, the air gap 11 can be controlled with high accuracy, and the solenoid actuator 1 (1A, 1B) with excellent attraction characteristics can be realized at low cost.

Next, a specific structural example of the solenoid actuator 1B shown in FIG. 3 will be described with reference to FIG. 6.

Hereinafter, the description of the configuration common to the solenoid actuator 1B shown in FIG. 3 will be omitted.

Figure 6:
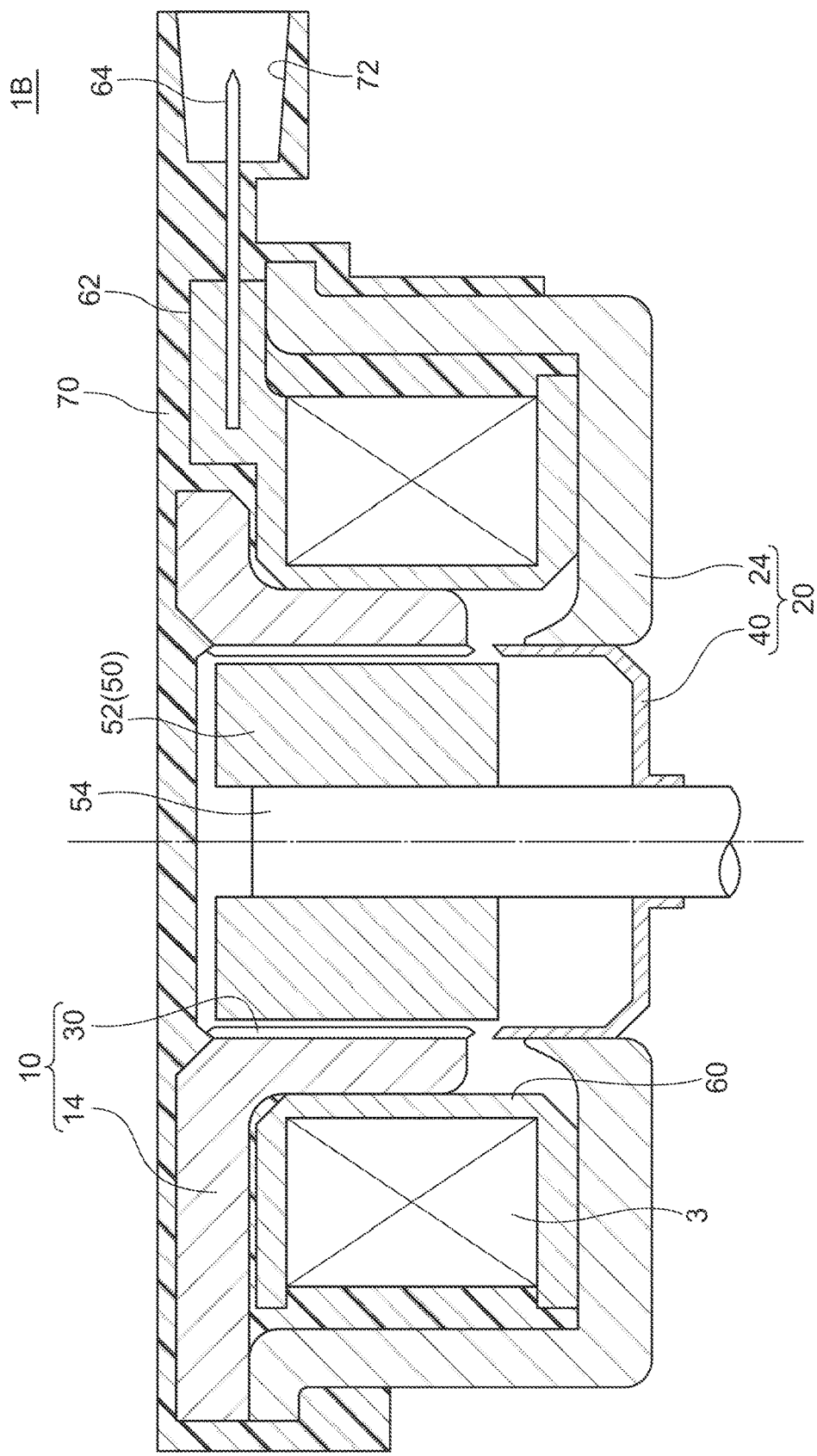
FIG. 6 is a view showing a specific structural example of the solenoid actuator according to another embodiment.

FIG. 6 is a cross-sectional view showing the solenoid actuator according to an embodiment.

As shown in FIG. 6, the solenoid actuator 1 includes the coil 3, the first stator 10 and the second stator 20, and the mover 50 (plunger 52).

The coil 3 is formed by winding a wire composed of a conductor such as copper or copper alloy around a bobbin 60. The bobbin 60 is substantially surrounded by the first stator 10 and the second stator 20. However, the first stator 10 (first yoke 14) is provided with a notch in a partial circumferential range, and a terminal holding portion 62 of the bobbin 60 is exposed in the notch of the first yoke 14. The terminal holding portion 62 of the bobbin 60 is embedded with a proximal end portion of a terminal 64. The terminal 64 is electrically connected to the wire, which constitutes the coil 3, in the bobbin 60.

Further, in the solenoid actuator 1B, the coil 3 and the bobbin 60, and the first stator 10 and the second stator 20 are integrally molded in a resin mold 70 and embedded in the resin mold 70. The terminal 64 penetrates the resin mold 70 from the terminal holding portion 62 of the bobbin 60, projects into a recess 72 disposed in the resin mold 70, and can electrically be connected to an external terminal fitted into the recess 72.

The resin mold 70 may have a projection (not shown) that contacts a rear end surface of the mover 50 (plunger 52) located at the original position.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

The invention claimed is:
1. A solenoid actuator, comprising:
a coil;

a first stator and a second stator disposed with an air gap therebetween in an axial direction so as to form a magnetic path around the coil; and a mover configured to move in the axial direction toward the second stator from an original position radially inward of the first stator by a magnetic force generated by energizing the coil, wherein the first stator includes:
a first yoke; and
a first cylindrical member fixed to an inner peripheral side of the first yoke and forming the air gap, the first cylindrical member being radially disposed between the mover and the first yoke.

2. The solenoid actuator according to claim 1,
wherein the first cylindrical member includes:
a magnetic tube formed of a magnetic material; and
a non-magnetic layer formed on an inner peripheral surface of the magnetic tube, and
wherein the first cylindrical member is configured to guide the mover in the axial direction by bringing the mover into sliding contact with the non-magnetic layer.

3. The solenoid actuator according to claim 1,
wherein the first yoke has a first through hole into which the first cylindrical member is press-fitted,
wherein an inner wall of the first through hole includes:
a contact region in contact with an outer peripheral surface of the first cylindrical member; and
a non-contact region located adjacent to the contact region on a side opposite to the second stator across the contact region in the axial direction, and
wherein a diameter of the first through hole at the contact region is the same as that at the non-contact region.

4. The solenoid actuator according to claim 1,
wherein the second stator includes:
a second yoke; and
a second cylindrical member fixed to an inner peripheral side of the second yoke and forming the air gap.

5. The solenoid actuator according to claim 4,
wherein the second cylindrical member is disposed so as to project from the second yoke toward the first stator.

6. The solenoid actuator according to claim 5,
wherein the second yoke decreases in thickness toward the air gap.

7. The solenoid actuator according to claim 4,
wherein the second yoke has an inner circumferential surface with a cylindrical shape, and the inner circumferential surface of the second yoke is in contact with an outer circumferential surface of the second cylindrical member.

8. The solenoid actuator according to claim 1,
wherein the first stator and the second stator are disposed on both sides of the coil in the axial direction so as to surround the coil.

9. The solenoid actuator according to claim 1,
wherein the first stator and the second stator are disposed to be in contact with each other at a contact section located on an outer peripheral side of the coil such that the coil is surrounded by the first stator and the second stator.

10. The solenoid actuator according to claim 1,
wherein the first cylindrical member has a distal end which projects from the first yoke toward the second stator in the axical direction, the air gap being formed between the distal end of the first cylindrical member and the second stator.

11. The solenoid actuator according to claim 1, further comprising
a shaft which is an output shaft of the solenoid actuator,
wherein the mover is a plunger disposed at an end portion of the shaft, and
wherein the first cylindrical member is radially disposed between the plunger and the first yoke.

12. The solenoid actuator according to claim 1,
wherein the mover is located at the original position radially inward of the first stator so as to radially face the first stator in a non-excited state of the coil, and
wherein the mover at the original position is distant from the second stator in the axial direction.

13. The solenoid actuator according to claim 12,
wherein the magnetic path includes the first stator, the second stator, and the mover, and
wherein the mover is configured to be magnetically attracted due to a magnetic flux flowing in the magnetic path and move from the original position toward the second stator when the coil is energized.

* * * * *